June 1, 1926.
J. E. HARRIS
1,586,558
MANUFACTURE OF ELECTRON DISCHARGE DEVICES
Filed Nov. 20, 1922
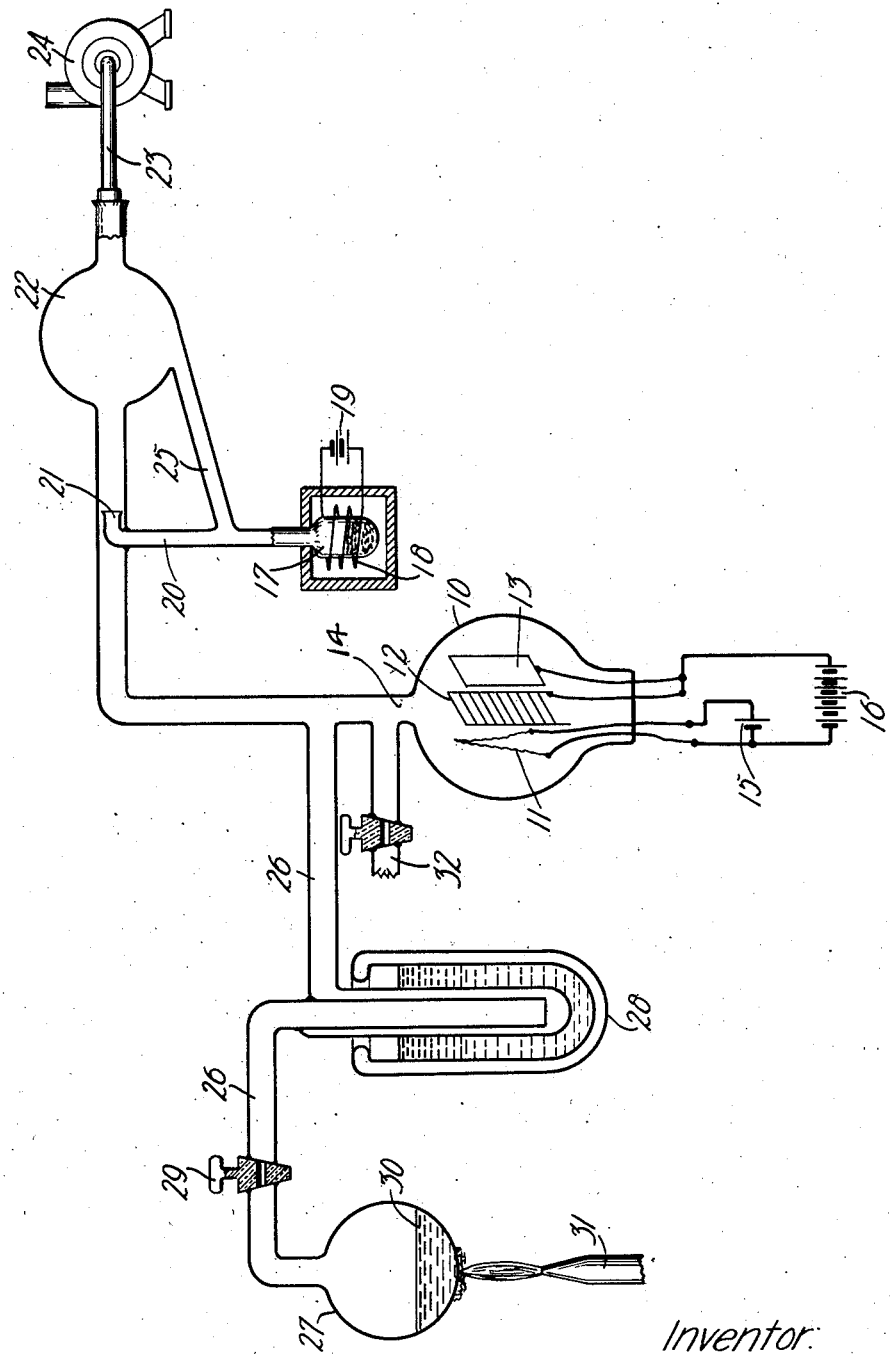
Inventor:
James E. Harris
by [signature] Atty.

Patented June 1, 1926.

1,586,558

UNITED STATES PATENT OFFICE.

JAMES E. HARRIS, OF NEWARK, NEW JERSEY, ASSIGNOR TO WESTERN ELECTRIC COMPANY, INCORPORATED, OF NEW YORK, N. Y., A CORPORATION OF NEW YORK.

MANUFACTURE OF ELECTRON-DISCHARGE DEVICES.

Application filed November 20, 1922. Serial No. 602,205.

This invention relates to the manufacture of electron discharge devices and has as its object to increase the emissivity of a filament coated with alkaline earth oxides.

According to this invention, a step in the evacuation of an electron discharge device having a filament coated with alkaline earth oxides consists in establishing a space discharge between the filament and the other electrodes of the device in an atmosphere of carbon monoxide sufficient to fill the envelope of the device with a blue haze after which the carbon monoxide is removed and the evacuation of the device completed.

Referring now to the drawings, the single figure discloses an apparatus for carrying out the invention.

A vacuum tube 10 having a filament 11 coated with alkaline earth oxides and a grid 12 and anode 13 is connected, by means of the tubulature 14, with a pumping apparatus. A battery 15 supplies heating current to the filament and a battery 16 establishes a difference of potential between the filament 11 and the grid and anode 12 and 13. The pumping apparatus consists of a boiler 17 containing mercury which is heated by means of the resistance element 18 to which current is supplied from a battery 19. A conduit 20 leads from the boiler 17 and terminates in a nozzle 21 which directs a stream of mercury vapor toward the air cooled condenser bulb 22 which is connected by the conduit 23 to an oil pump 24. A conduit 25 provides for the return of the condensed mercury to the boiler. By means of this apparatus, the tube 10 may be exhausted in the well known manner.

In order to supply carbon monoxide to the vessel 10, a conduit 26 leads from the tubulature 14 to a vessel 27 through a liquid air trap 28. A valve 29 is provided in the conduit 26 to shut off the vessel 27 from the pumping apparatus. In the vessel 27 is provided a supply of sodium formate and a gas flame 31 is provided for heating the vessel 27. With the valve 29 closed the pumping apparatus is operated to remove the gas from the vessel 10. After the gas has been removed, the valve 29 is opened and the sodium formate is gently heated to generate carbon monoxide which is led through the liquid air trap to the vessel 10, the liquid air trap serving to prevent any water vapor or carbon dioxide which may be generated, from reaching the vessel 10. A space discharge is now established between the cathode 11 and the other two electrodes by connecting in the batteries 15 and 16. The carbon monoxide is maintained at a sufficient density within the vessel 10 to keep the vessel filled with a blue haze from the discharge between the electrodes. This is kept up for a period of time depending upon the size of the electrodes, after which the valve 29 is closed, the carbon monoxide pumped out and the evacuation of the tube completed in the usual way. One-half hour of treatment, as above outlined, has been found to materially increase the activity of a coated filament.

The electrodes are preferably prepared for the above described treatment by glowing them in an atmosphere of hydrogen whereby oxygen in the cathode coating is removed. To supply the hydrogen a conduit 32 leads from a hydrogen source (not shown) to the tubulature 14.

The invention claimed is:

1. The method of evacuating an electron discharge device having a filament coated with alkaline earth oxides, which comprises removing the gas from the envelope of the device and establishing a space discharge between the electrodes of said device in an atmosphere of carbon monoxide.

2. The method of evacuating an electron discharge device having a filament coated with alkaline earth oxides which consists in establishing a space discharge between the electrodes in an atmosphere of carbon monoxide of sufficient density to cause a blue haze.

3. The method of exhausting an electron discharge device having a filament coated with alkaline earth oxides which comprises evacuating the envelope of the device, admitting carbon monoxide to said envelope and establishing a space discharge between the electrodes.

4. The method of evacuating an electron discharge device having a filament coated with alkaline earth oxides which comprises evacuating the envelope of the device, establishing a space discharge between the filament and the other electrodes, and admitting carbon monoxide to said envelope in sufficient quantities to cause a blue haze from the discharge.

5. The method of evacuating an electron discharge device having a filament coated with alkaline earth oxides which comprises evacuating the envelope of the device, glowing the electrodes in an atmosphere of hydrogen, removing the hydrogen, establishing a space discharge between the electrodes in an atmosphere of an oxide of carbon.

In witness whereof, I hereunto subscribe my name this 15th day of November A. D., 1922.

JAMES E. HARRIS.